US012671155B2

(12) United States Patent
Imamoto

(10) Patent No.: US 12,671,155 B2
(45) Date of Patent: Jun. 30, 2026

(54) FILM INCLUDING A RESIN LAYER CONTAINING POLYETHYLENE, POLYPROPYLENE, AND A COMPATIBILIZER FOR A TERMINAL

(71) Applicant: TOPPAN Holdings Inc., Tokyo (JP)

(72) Inventor: Junya Imamoto, Tokyo (JP)

(73) Assignee: TOPPAN HOLDINGS INC., Tokyo (JP)

(*) Notice: Subject to any disclaimer, the term of this patent is extended or adjusted under 35 U.S.C. 154(b) by 671 days.

(21) Appl. No.: 17/889,643

(22) Filed: Aug. 17, 2022

(65) Prior Publication Data

US 2022/0399621 A1 Dec. 15, 2022

Related U.S. Application Data

(63) Continuation of application No. PCT/JP2021/001821, filed on Jan. 20, 2021.

(30) Foreign Application Priority Data

Feb. 21, 2020 (JP) ................................. 2020-028616

(51) Int. Cl.
| | |
|---|---|
| *H01M 2/02* | (2006.01) |
| *B32B 27/08* | (2006.01) |
| *B32B 27/32* | (2006.01) |
| *H01M 10/0525* | (2010.01) |
| *H01M 50/186* | (2021.01) |
| *H01M 50/193* | (2021.01) |
| *H01M 50/562* | (2021.01) |
| *H01M 50/591* | (2021.01) |

(52) U.S. Cl.
CPC ........... *H01M 50/591* (2021.01); *B32B 27/08* (2013.01); *B32B 27/32* (2013.01); *H01M 10/0525* (2013.01); *H01M 50/186* (2021.01); *H01M 50/193* (2021.01); *H01M 50/562* (2021.01); *B32B 2250/03* (2013.01); *B32B 2270/00* (2013.01); *B32B 2457/10* (2013.01)

(58) Field of Classification Search
CPC ............. H01M 50/591; H01M 50/186; H01M 50/193; H01M 50/562; H01M 10/0525; H01M 10/052; B32B 27/08; B32B 27/32; B32B 2250/03; B32B 2270/00; B32B 2457/10
See application file for complete search history.

(56) References Cited

U.S. PATENT DOCUMENTS

| | | |
|---|---|---|
| 2012/0111407 A1 | 5/2012 | Rummens |
| 2013/0209868 A1 | 8/2013 | Suzuta et al. |
| 2016/0099447 A1 | 4/2016 | Takada |
| 2019/0001634 A1 | 1/2019 | Takei et al. |

FOREIGN PATENT DOCUMENTS

| | | | | |
|---|---|---|---|---|
| JP | 05129008 A | * | 5/1993 | ............. H01M 2/02 |
| JP | H06-155676 A | | 6/1994 | |
| JP | H06-307581 A | | 11/1994 | |
| JP | 2000-109609 A | | 4/2000 | |
| JP | 2004-327046 A | | 11/2004 | |
| JP | 2005-174825 A | | 6/2005 | |
| JP | 2008-004316 A | | 1/2008 | |
| JP | 2008-016337 A | | 1/2008 | |
| JP | 2008-192451 A | | 8/2008 | |
| JP | 2009-259739 A | | 11/2009 | |
| JP | 2010-218766 A | | 9/2010 | |
| JP | 2012-046031 A | | 3/2012 | |
| JP | 2012-215460 A | | 11/2012 | |
| JP | 2013-243084 A | | 12/2013 | |
| JP | 2014-170720 A | | 9/2014 | |
| JP | 2014-210841 A | | 11/2014 | |
| JP | 2014-225378 A | | 12/2014 | |
| JP | 5934646 B2 | | 6/2016 | |
| JP | 2017-036354 A | | 2/2017 | |
| JP | 2017-073200 A | | 4/2017 | |
| JP | 2017-139121 A | | 8/2017 | |
| JP | 2019-029221 A | | 2/2019 | |
| JP | 2019-102262 A | | 6/2019 | |
| JP | 2019-116010 A | | 7/2019 | |
| WO | WO-2012/050182 A1 | | 4/2012 | |
| WO | WO-2015/008826 A1 | | 1/2015 | |

OTHER PUBLICATIONS

English language abstract of JP 05129008) Koichiro et al., Battery, May 25, 1993.*
Notice of Submission of Publications issued in corresponding Japanese Patent Application No. 2020-028616 dated Oct. 31, 2024.
Osaka Municipal Technical Research Institute et al., "Plastics Reader", Plastics Age Co. Ltd., Oct. 1, 2009, 20th edition.
Office Action issued in corresponding Japanese Patent Application No. 2020-028616 dated Jul. 16, 2024 (5 pages).
Third Party Observation issued in corresponding PCT International Patent Application No. PCT/JP2021/001821 dated Jun. 20, 2022.
Submission of Publications issued in corresponding Japanese Patent Application No. 2020-028616 dated Jun. 28, 2024.
International Searching Authority, "International Search Report," issued in connection with International Patent Application No. PCT/JP2021/001821, dated Mar. 30, 2021.
International Searching Authority, "Written Opinion," issued in connection with International Patent Application No. PCT/JP2021/001821, dated Mar. 30, 2021.
European Extended Search Report issued in corresponding European Patent Application No. 21756520.9 dated Jul. 31, 2024 (8 pages).

(Continued)

*Primary Examiner* — Raymond Alejandro
(74) *Attorney, Agent, or Firm* — XSENSUS LLP

(57) ABSTRACT

A film having a resin layer containing polyethylene, polypropylene, and a compatibilizer for a terminal for covering the outer peripheral surface of part of a metal terminal that constitutes a power storage device. The compatibilizer having a region which is compatible with the polyethylene and a region which is compatible with polypropylene.

18 Claims, 4 Drawing Sheets

(56) References Cited

OTHER PUBLICATIONS

Zhu et al., "Modification of PP/HDPE Blends by PP-PE Sequential Polymerization Product", Journal of Applied Polymer Science, John Wiley & Sons, Inc, US, vol. 58, No. 3, XP000541096, Oct. 17, 1995, pp. 515-521.
Third Party Observation issued in corresponding Korean Patent Application No. 10-2022-7030606 dated Jan. 20, 2026.
Third Party Observation issued in corresponding European Patent Application No. 21756520.9 dated Aug. 18, 2025.

* cited by examiner

FILM INCLUDING A RESIN LAYER CONTAINING POLYETHYLENE, POLYPROPYLENE, AND A COMPATIBILIZER FOR A TERMINAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/001821, filed on Jan. 20, 2021, which in turn claims the benefit of JP 2020-028616, filed Feb. 21, 2020 the disclosures of all which are incorporated herein by reference in its entirety.

TECHNICAL FIELD

The present disclosure relates to a resin film for a terminal, and a power storage device using the same.

BACKGROUND

In recent years, there is an increasing need to downsize mobile devices and to effectively use electrical energy generated from natural resources. Therefore, research and development are underway to achieve lithium ion secondary batteries (a type of power storage device) that can provide higher voltages and have high energy density.

Conventionally, metallic cans have often been used as the packaging material used for such lithium ion cells. However, to meet the need for providing thinner and more diversified products to which the lithium ion batteries are applied, pouched laminates in which a metal layer (such as an aluminum foil) and a resin film are laminated, which can be produced at low cost, have become mainstream as packaging materials.

A laminated lithium ion secondary battery, in which a battery body is accommodated and sealed inside the packaging material described above, is provided with current extraction terminals referred to as tabs. A tab is connected to the negative electrode or the positive electrode of the battery body, and includes a metal terminal (sometimes referred to as a "tab lead") that extends to the outside of the packaging material (exterior material), and a resin film for a terminal (sometimes referred to as a "tab sealant") that covers each of the outer peripheral surfaces of a portion of the metal terminal (for example, see PTL 1 to 3). Normally, the resin film for a terminal is fused to the metal terminals.

Furthermore, a high level of safety is demanded of power storage devices such as the lithium ion secondary battery described above. Power storage devices generally use an organic solvent as an electrolyte. However, when power storage devices are exposed to high temperatures, the temperature rise can sometimes cause the organic solvent to volatilize or decompose and generate a flammable gas, resulting in an increase in the pressure inside the packaging material. When the temperature rises and the increase in the pressure inside the packaging material progresses further, excessive expansion of the packaging material can occur, resulting in an increase in the risk of problems such as ruptures and explosions. Therefore, in order to prevent such problems from occurring, power storage devices are provided with safety measures that enable gases to be released externally when the pressure inside the packaging material rises excessively.

For example, PTL 4 proposes a battery case provided with an explosion-proof structure provided with a half-cut portion formed by laser irradiation. Furthermore, for example, PTL 5 proposes a packaging material for a battery that can be unsealed when a set temperature is reached by regulating the melting point of a sealant layer in the packaging material, which suppresses excessive expansion and runaway battery reaction.

CITATION LIST

Patent Literature

PTL 1: JP 2008-4316 A; PTL 2: JP 2010-218766 A; PTL 3: JP 2009-259739 A; PTL 4: JP 2004-327046 A; PTL 5: JP 2014-170720 A.

SUMMARY OF THE INVENTION

Technical Problem

However, because the battery case described in PTL 4 requires equipment and a process for forming the explosion-proof structure by laser irradiation, there is a problem that the production efficiency is poor. Furthermore, because the half-cut portion is provided, there is also a problem that the barrier performance and impact resistance tend to decrease. On the other hand, in the packaging material for a battery described in PTL 5, because the entire sealant layer may become cleaved at a set temperature, the cleavage area is large and the organic solvent may leak out. Moreover, because the cleavage area is large, there is a problem that it is difficult to confirm whether cleavage has actually occurred.

The present disclosure has been made in view of the background art described above, and has an object of providing a resin film for a terminal having excellent openability under high temperature environmental conditions and excellent adhesion between an exterior material and a metal terminal under room temperature environmental conditions, and which is capable of increasing the level of safety of a power storage device, and a power storage device using the same.

Solution to Problem

In order to achieve the above object, the present disclosure provides a resin film for a terminal for covering an outer peripheral surface of part of a metal terminal that constitutes a power storage device, including: a resin layer containing a polyethylene (A), and a compatibilizer (B) having a region which is compatible with the polyethylene (A) and a region which is compatible with polypropylene.

Generally, a film made of polypropylene (PP) is commonly used as a resin film for a terminal. However, because a resin film for a terminal made of PP is difficult to unseal even at high temperatures due to the high melting point, it does not readily function as a safety valve that prevents, under high temperature environmental conditions, excessive expansion of the power storage device and runaway of the battery reaction. In contrast, because polyethylene (PE) has a low melting point, it has excellent openability under high temperature environmental conditions, and is effective as a safety valve. However, a resin film for a terminal made of PE does not provide sufficient adhesion to the exterior material, and it is difficult to satisfy the basic characteristics required of a resin film for a terminal. This is because a sealant layer made of PP is generally used as the sealant layer of the exterior material. Therefore, the present inventors have studied resin films for a terminal in which PE and PP are used in combination. However, the adhesion to the exterior material was still insufficient. The present inventors presume that this is because PP and PE form a sea-island interface, and sufficient strength is not obtained because the interface is more easily cracked.

As a result of further diligent studies, the present inventors have found that it is possible to achieve both openability under high temperature environmental conditions and adhesion between an exterior material and a metal terminal under room temperature environmental conditions by including, in a resin layer constituting a resin film for a terminal, polyethylene (A), and a compatibilizer (B) having a region which is compatible with the polyethylene (A) and a region which is compatible with polypropylene. As a result of the compatibilizer (B) having a region which is compatible with the polyethylene (A), it is possible to increase the adhesion strength between the compatibilizer (B) and the polyethylene (A). Further, by including a region which is compatible with polypropylene, it is possible to increase the adhesion strength between the resin film for a terminal and the sealant layer of the exterior material via the compatibilizer (B). Therefore, in the resin film for a terminal described above, because the resin layer includes the polyethylene (A), it is capable of exhibiting excellent openability under high temperature environmental conditions and excellent adhesion to a metal terminal under room temperature environmental conditions. Further, because the resin layer includes the compatibilizer (B), it is capable of exhibiting excellent adhesion to an exterior material under room temperature environmental conditions without loss of the effects of the polyethylene (A) described above, and the level of safety of power storage devices can be increased.

In the resin film for a terminal described above, the compatibilizer (B) may be a block copolymer or a graft copolymer. As a result of the compatibilizer (B) being a block copolymer or a graft copolymer, it is possible to improve the compatibility with the polyethylene (A) and the adhesion with the sealant layer of the exterior material.

In the resin film for a terminal described above, the compatibilizer (B) may include an amorphous unit. As a result of the compatibilizer (B) including an amorphous unit, it is possible to improve the openability under high temperature environmental conditions.

In the resin film for a terminal described above, a mass ratio ((A)/(B)) of the polyethylene (A) and the compatibilizer (B) contained in the resin layer may be 0.15 to 30. If the ratio of the compatibilizer (B) to the polyethylene (A) is too low, the adhesion between the exterior material and the sealant layer tends to decrease, and if it is too high, the adhesion to the metal terminal tends to decrease. As a result of setting the mass ratio ((A)/(B)) within the above range, it is possible to achieve both the adhesion of the exterior material to the sealant layer, and the adhesion to the metal terminal at a higher level.

In the resin film for a terminal described above, the resin layer may further contain a polypropylene (C). As a result of the resin layer containing the polypropylene (C), the sealing strength at temperatures lower (such as 100° C.) than the target unsealing temperature (such as 130° C.) can be improved, and the unsealing temperature can be controlled.

In the resin film for a terminal described above, the resin layer may contain a resin having a polar group. At least one of the polyethylene (A), the compatibilizer (B), and the polypropylene (C) may be a resin having a polar group, or the resin having another polar group may be used. When the resin layer contains a resin having a polar group, the adhesion to the metal terminal can be further improved.

The resin film for a terminal described above may consist of three or more layers, and a layer disposed on at least both surfaces of the resin film for a terminal may be the resin layer described above. As a result of both surfaces having the resin layer described above, it is possible to obtain both excellent openability under high temperature environmental conditions, and excellent adhesion between the exterior material and the metal terminal under room temperature environmental conditions. Furthermore, by forming a multilayer structure having three or more layers, it is possible to dispose an intermediate layer having various functions between the resin layer on both surfaces. For example, by providing an insulating layer as an intermediate layer, it is possible to further improve the insulating properties. Moreover, by disposing the resin layer described above on both surfaces, the occurrence of curling of the resin film for a terminal can be suppressed.

Furthermore, the present disclosure provides a power storage device including: a power storage device body; a metal terminal electrically connected to the power storage device body; an exterior material that sandwiches the metal terminal and accommodates the power storage device body; and a resin film for a terminal of the present disclosure disposed between the metal terminal and the exterior material so as to cover an outer peripheral surface of part of the metal terminal; wherein the exterior material has a sealant layer containing polypropylene on a surface that makes contact with the resin film for a terminal. The power storage device has excellent openability under high temperature environmental conditions, excellent adhesion with the exterior material, the metal terminal, and the resin film for a terminal under room temperature environmental conditions, and has a high level of safety.

Advantageous Effects of the Invention

According to the present disclosure, it is possible to provide a resin film for a terminal that has excellent openability under high temperature environmental conditions, excellent adhesion to the exterior material and the metal terminal under room temperature environmental conditions, and is capable of enhancing the level of safety of a power storage device, and a power storage device using the same.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Figure 1:
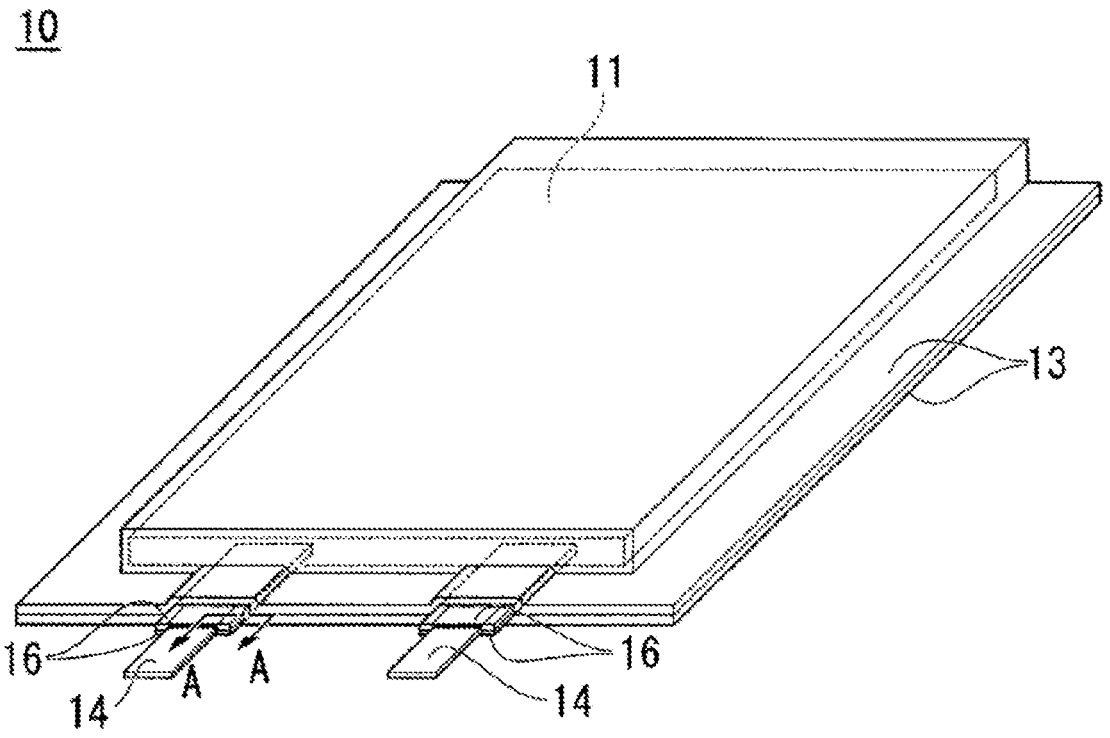
FIG. 1 is a perspective view illustrating a schematic configuration of a power storage device according an embodiment of the present disclosure.

FIG. 1 is a perspective view illustrating a schematic configuration of a power storage device according to an embodiment of the present disclosure. FIG. 1 shows a lithium ion secondary battery as an example of a power storage device 10. The following description is provided by way of this example. The lithium ion secondary battery, whose configuration is shown in FIG. 1, is often called a battery pack or a battery cell.

The power storage device 10 shown in FIG. 1 is a lithium ion secondary battery, and includes a power storage device body 11, an exterior material 13, a pair of metal terminals 14 (tab leads), and a resin film for a terminal 16 (tab sealant).

The power storage device body 11 is a battery body that can be charged and discharged. The exterior material 13 sandwiches the metal terminals 14 and accommodates the power storage device main body 11. The exterior material 13 is disposed so as to cover the surface of the power storage device body 11 and make contact with part of the resin film for a terminal 16.

Figure 2:
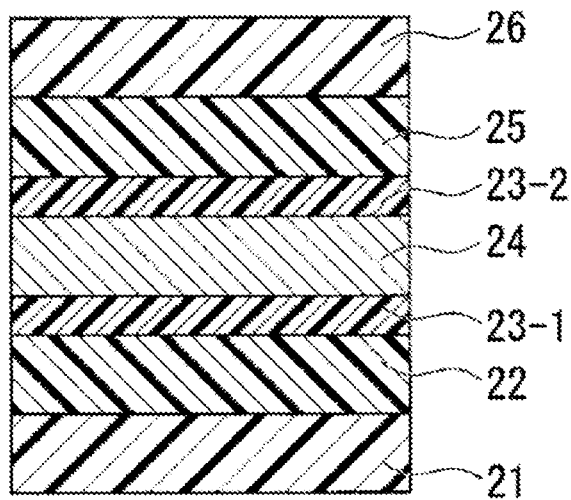
FIG. 2 is a cross-sectional view illustrating an example of a cross-section of the exterior material shown in FIG. 1.

FIG. 2 is a cross-sectional view illustrating an example of a cross section of the exterior material shown in FIG. 1. In FIG. 2, the same components as those shown in FIG. 1 are denoted by the same reference signs.

Referring now to FIG. 2, an example of a configuration of the exterior material 13 will be described. The exterior material 13 has a seven-layer structure including an inner layer 21, an inner layer-side adhesive layer 22, an anti-corrosion treatment layer 23-1, a metal layer serving as a barrier layer 24, an anti-corrosion treatment layer 23-2, an outer layer-side adhesive layer 25, and an outer layer 26, which are laminated in this order from an inner side contacting the power storage device body 11.

For example, the inner layer 21 is a sealant layer that imparts sealing properties to the exterior material 13 by heat sealing, and is a layer which is heat sealed (thermally adhered) when disposed on the inside when the power storage device 10 is assembled. Base materials that can be used for the inner layer (sealant layer) 21 include, for example, polyolefin resins, or acid-modified polyolefin resins obtained by graft-modifying polyolefin resins with maleic anhydrides or the like. The polyolefin resins that can be used include: low-density, medium-density and high-density polyethylenes; ethylene-$\alpha$-olefin copolymers; homo-, block- or random-polypropylenes; and propylene-$\alpha$-olefin copolymers. Among these, the polyolefin resin preferably contains polypropylene. These polyolefin resins may be used singly or in combination of two or more.

Furthermore, depending on the required functions, the inner layer 21 may be formed using a single-layer film or a multilayer film in which a plurality of layers are laminated. Specifically, for example, a multilayer film interposed by a resin, such as ethylene-cyclic olefin copolymer or polymethyl pentene, may be used to impart moisture resistance. In addition, the inner layer 21 may contain, for example, various additives (such as flame retarders, slip agents, anti-blocking agents, antioxidants, light stabilizers, tackifiers, and the like).

For example, the thickness of the inner layer 21 is preferably set in a range of 10 μm to 150 μm and more preferably in a range of 30 μm to 80 μm. When the thickness of the inner layer 21 is 10 μm or more, the heat sealing adhesion of the exterior material 13 with itself and the adhesion to the resin film for a terminal 16 is sufficiently high. Furthermore, when the thickness of the inner layer 21 is 150 μm or less, an increase in the cost of the exterior material 13 can be suppressed.

As the inner layer-side adhesive layer 22, a known adhesive can be appropriately selected and used, such as a generally used adhesive for dry lamination, an acid-modified thermally adhesive resin, or the like.

As shown in FIG. 2, it is preferable that the anti-corrosion treatment layers 23-1 and 23-2 are formed on both surfaces of the barrier layer 24 from the viewpoint of performance. However, taking account of cost, the anti-corrosion treatment layer 23-1 alone may be arranged on the inner layer-side adhesive layer 22 side surface of the barrier layer 24.

The barrier layer 24 is, for example, a metal layer having electrical conductivity. The material used for the barrier layer 24 may, for example, be aluminum, stainless steel, or the like. However, from the perspective of cost or weight (density), aluminum is preferred.

Materials that can be used for the outer layer-side adhesive layer 25 include, for example, a general polyurethane-based adhesives containing polyester polyol, polyether polyol, acrylic polyol or the like as a main compound.

Layers that can be used for the outer layer 26 include, for example, single-layer films or multi-layer films such as of nylon or polyethylene terephthalate (PET). Similar to the inner layer 21, the outer layer 26 may contain various additives (e.g. flame retarders, slip agents, anti-blocking agents, antioxidants, light stabilizers, tackifiers, and the like), for example. Furthermore, the outer layer 26 may include, as a measure against fluid leakage, a protective layer formed, for example, by laminating a resin which is insoluble in an electrolytic solution, or coating a resin component which is insoluble in an electrolyte solution.

Figure 3:
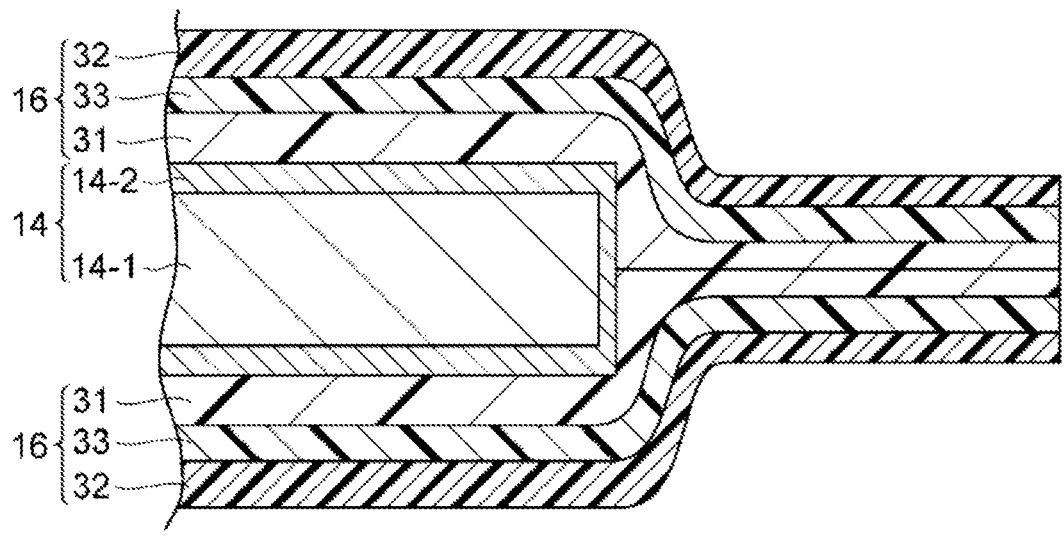
FIG. 3 is a cross-sectional view taken along the line A-A of FIG. 1, illustrating the resin film for a terminal and the metal terminal shown in FIG. 1.

FIG. 3 is a cross-sectional view taken along the line A-A of FIG. 1, illustrating the resin film for a terminal and the metal terminal shown in FIG. 1. In FIG. 3, the components identical with those of the structure shown in FIG. 1 are given the same reference signs.

As shown in FIGS. 1 and 3, a pair (two in FIG. 1) of metal terminals 14 each include a metal terminal body 14-1 and an anti-corrosion layer 14-2. Of the pair of metal terminal bodies 14-1, one metal terminal body 14-1 is electrically connected to a positive electrode of the power storage device body 11, and the other metal terminal body 14-1 is electrically connected to a negative electrode of the power storage device body 11. The pair of metal terminal bodies 14-1 extend in a direction away from the power storage device body 11, and partially exposed from the exterior material 13. The pair of metal terminal bodies 14-1 may each have a plate-like shape, for example.

Metals can be used as the material of the metal terminal bodies 14-1. The material serving as the metal terminal bodies 14-1 is preferably determined taking account, for example, of the structure of the power storage device body 11, the materials of the components of the power storage device body 11, and the like.

For example, when the power storage device 10 is a lithium ion secondary battery, aluminum is used as a positive electrode current collector, while copper is used as a negative electrode current collector. In this case, aluminum is preferably used as the material for the metal terminal body 14-1 connected to the positive electrode of the power storage device body 11. Furthermore, taking account of corrosion resistance to an electrolytic solution, an aluminum material, such as 1N30 having purity of 97% or more is preferably used, for example, as a material for the metal terminal body 14-1 connected to the positive electrode of the power storage device body 11. In addition, when the metal terminal body 14-1 is bent, a metal material which is tempered by sufficient annealing is preferably used for the purpose of adding flexibility. As a material used for the metal terminal body 14-1 connected to the negative terminal of the power storage device body 11, it is preferable to use copper whose surface is provided with a nickel-plated layer, or to use nickel.

The thickness of the metal terminal bodies 14-1 can be set according to the size or capacity of the lithium ion secondary battery. If the lithium ion secondary battery is of a small size, the thickness of the metal terminal bodies 14-1 is preferably 50 μm or more, for example. If the lithium ion secondary battery is of a large size so as to be applicable such as to electrical storage and vehicle installation, the thickness of the metal terminal bodies 14-1 can be appropriately set to within the range of 100 μm to 500 μm for example.

The anti-corrosion layer 14-2 is arranged covering at least part of the surface of the metal terminal body 14-1. Lithium ion secondary batteries include an electrolytic solution that contains corrosive components, such as $LiPF_6$. The anti-corrosion layer 14-2 minimizes corrosion of the metal terminal body 14-1 caused by the corrosive components, such as $LiPF_6$, contained in the electrolytic solution.

As shown in FIG. 3, the resin film for a terminal 16 is disposed so as to cover part of the outer periphery of the metal terminal 14. In the present embodiment, the resin film for a terminal 16 is provided with three or more layers, and has a configuration in which a first resin layer 31 that makes contact with the outer peripheral surface of the metal terminal 14, a second resin layer 32 that makes contact with the exterior material 13, and an intermediate layer 33 disposed between the first resin layer 31 and the second resin layer 32, are laminated. The first resin layer 31 is disposed on one surface of the resin film for a terminal 16, and the second resin layer 32 is disposed on the surface on the opposite side to the first resin layer 31 of the resin film for a terminal 16. The resin film for a terminal 16 may be constituted by one or two layers, and may also be constituted by four or more layers.

The first resin layer 31, which is disposed so as to cover the outer peripheral surface of the metal terminal 14, seals the metal terminal 14 in the circumferential direction, and has a function that causes adhesion between the resin film for a terminal 16 and the metal terminal 14. Furthermore, the second resin layer 32, which is fused to the exterior material 13, has a function that seals the inside of the exterior material 13.

In the present embodiment, the first resin layer 31 and the second resin layer 32 include a polyethylene (A) (hereinafter referred to as "component (A)"), and a compatibilizer (B) (hereinafter referred to as "component (B)") which has a region which is compatible with the polyethylene (A) and a region which is compatible with polypropylene. The first resin layer 31 and the second resin layer 32 may further contain a polypropylene (C) (hereinafter referred to as "component (C)"). The first resin layer 31 and the second resin layer 32 may contain a resin having a polar group. The resin having a polar group may be one of the components (A) to (C), or may be a resin (D) (hereinafter referred to as "component (D)") having a polar group, being a separate component to the components (A) to (C).

Examples of the polyethylene (A) include very low-density polyethylene (VLDPE), low-density polyethylene (LDPE), linear low-density polyethylene (LLDPE), medium-density polyethylene (MDPE), and high-density polyethylene (HDPE). Among these, the use of LDPE and LLDPE is preferable from the viewpoint of improving the heat sealing properties and the heat sealing strength.

The polyethylene (A) may contain a modified polyethylene having a polar group. As a result of the polyethylene (A) having a polar group, the adhesion between the first resin layer 31 and the metal terminal 14 can be further improved. Examples of the polar group include a hydroxyl group, a glycidyl group, an amide group, an imino group, an oxazoline group, an acid anhydride group, a carboxyl group, and an ester group. From the viewpoint of reactivity, an acid anhydride group (particularly a group derived from maleic anhydride) is preferable as the polar group. The modified polyethylene may be an acid-modified polyethylene obtained by graft-modifying polyethylene with maleic anhydride or the like. Specific product examples of the modified polyethylene include, for example, "Admer" manufactured by Mitsui Chemicals Corporation, "Modic" manufactured by Mitsubishi Chemical Corporation, and the like. The polyethylene (A) resin may be used singly or in a combination of two or more types.

The melting point of the polyethylene (A) is preferably from 80 to 135° C., and more preferably from 100 to 125° C. As a result of the melting point of the polyethylene (A) being 135° C. or less, the openability under high temperature environmental conditions can be improved, and by being 80° C. or more, unsealing during the manufacturing of the power storage device can be prevented.

In the present specification, the melting point of a resin is measured using a differential scanning calorimeter (DSC), by taking the peak top of the largest heat of dissolution as the main peak and then reading the temperature of the peak.

In the first resin layer 31 and the second resin layer 32, the content of the polyethylene (A) is preferably 5 to 95% by mass, and more preferably 10 to 75% by mass relative to the total mass of the layers. When the content of the polyethylene (A) is 5% by mass or more, there is a tendency for the openability under high temperature environmental conditions and the adhesion to the metal terminal under room temperature environmental conditions to further improve. Further, when the content is 95% by mass or less, there is a tendency for the adhesion to the exterior material under room temperature environmental conditions to further improve.

The compatibilizer (B) has a region which is compatible with the polyethylene (A) and a region which is compatible with polypropylene, and has a function that improves the adhesion between the second resin layer 32 and the exterior material 13. When the first resin layer 31 and the second resin layer 32 contain the polypropylene (C), the compatibilizer (B) has a function that improves the adhesion strength of the sea-island interface between the polyethylene (A) and the polypropylene (C).

Examples of the compatibilizer (B) include ethylene-propylene rubber (EPR), ethylene-propylene-diene rubber (EPDM), and block copolymers having a region which is compatible with the polyethylene (A) and a region which is compatible with polypropylene, and graft copolymers having a region which is compatible with the polyethylene (A) and a region which is compatible with polypropylene.

Examples of the block copolymer include block copolymers composed of a crystalline polyethylene unit and an ethylene/butylene copolymer unit, block copolymers composed of a polyethylene unit and an ethylene/1-octene copolymer unit, and block copolymers composed of a polypropylene unit and a polyethylene unit. Examples of the graft copolymer include a graft copolymer in which a polyethylene unit is grafted to polypropylene. Each unit constituting the copolymers described above may be a crystalline unit or an amorphous unit.

In terms of the compatibilizer (B), it is preferable to use a block copolymer or a graft copolymer from the viewpoint of compatibility, and it is preferable to use a compatibilizer having an amorphous unit from the viewpoint of openability. The compatibilizer (B) can be used singly or in combination of two or more.

In the compatibilizer (B), the content ratio of the region which is compatible with the polyethylene (A) and the region which is compatible with polypropylene (mass ratio of region which is compatible with the polyethylene (A)/ region which is compatible with polypropylene) is preferably 1/9 to 9/1, more preferably 2/8 to 8/2, and even more preferably 3/7 to 7/3. As a result of the content ratio being 1/9 or more, the adhesion strength between the compatibilizer (B) and the polyethylene (A) can be increased. On the other hand, as a result of the content ratio being 9/1 or less, the adhesion strength between the resin film for a terminal and the sealant layer of the exterior material via the compatibilizer (B) can be further increased.

In the first resin layer 31 and the second resin layer 32, the mass ratio of the polyethylene (A) to the compatibilizer (B) ((A)/(B)) is preferably 0.15 to 30, more preferably 0.5 to 10, and even more preferably 1.0 to 5. When the mass ratio ((A)/(B)) is 0.15 or more, there is a tendency for the openability under high temperature environmental conditions and the adhesion to the metal terminal under room temperature environmental conditions to further improve. Further, when the mass ratio is 30 or less, there is a tendency for the adhesion to the exterior material under room temperature environmental conditions to further improve.

As the polypropylene (C), homopolypropylene, random polypropylene, block polypropylene and the like can be used. Among these, from the viewpoint of openability and impact resistance under high temperature environmental conditions, it is preferable to use random polypropylene having a melting point of 110 to 150° C.

The polypropylene (C) may contain modified polypropylene having a polar group. As a result of the polypropylene (C) having a polar group, the adhesion between the first resin layer 31 and the metal terminal 14 can be improved. Examples of the polar group include a hydroxyl group, a glycidyl group, an amide group, an imino group, an oxazoline group, an acid anhydride group, a carboxyl group, and an ester group. From the viewpoint of reactivity, an acid anhydride group (particularly a group derived from maleic anhydride) is preferable as the polar group. The modified polypropylene may be an acid-modified polypropylene obtained by graft-modifying polypropylene with maleic anhydride or the like. Specific product examples of modified polypropylene include, for example, "Admer" manufactured by Mitsui Chemicals Corporation, "Modic" manufactured by Mitsubishi Chemical Corporation, "TOYO-TAC" manufactured by Toyobo Co., Ltd., and "YUMEX/SANSTACK" manufactured by Sanyo Chemical Industries, Ltd. The polypropylene (C) may be used singly or in a combination of two or more types.

The melting point of the polypropylene (C) is preferably from 110° C. to 165° C., and more preferably from 120° C. to 150° C. As a result of the melting point of the polypropylene (C) being 165° C. or less, it is possible to suppress a decrease in openability under high temperature environmental conditions. Further, as a result of the melting point being 110° C. or more, the sealing strength at temperatures (for example, 100° C.) below the target unsealing temperature (for example, 130° C.) can be further improved. Therefore, the unsealing temperature can be appropriately controlled.

When the first resin layer 31 and/or the second resin layer 32 contains the polypropylene (C), the content is preferably from 5% by mass to 95% by mass, and more preferably from 30% by mass to 80% by mass relative to the total mass of the layers. When the content of the polypropylene (C) is 5% by mass or more, the sealing strength at temperatures (for example, 100° C.) below the target unsealing temperature (for example, 130° C.) can be further improved. Therefore, the unsealing temperature can be appropriately controlled. On the other hand, when the content of the polypropylene (C) is 95% by mass or less, it is possible to suppress a decrease in the openability under high temperature environmental conditions.

In addition to the components (A) to (C) described above, the first resin layer 31 and the second resin layer 32 may contain a resin (D) having a polar group (hereinafter referred to as "polar resin"). The addition of the polar resin (D) is effective when none of the components (A) to (C) described above have a polar group, but it may also be further added when one or more of the components (A) to (C) described above have a polar group.

Examples of the polar group contained in the polar resin (D) include a hydroxyl group, a glycidyl group, an amide group, an imino group, an oxazoline group, an acid anhydride group, a carboxyl group and an ester group. From the viewpoint of reactivity, an acid anhydride group (particularly a group derived from maleic anhydride) is preferable as the polar group. The polar resin (D) preferably has a region which is partially compatible with the polyethylene (A).

Although the polar resin (D) provided in addition to the components (A) to (C) described above is not particularly limited, examples include copolymers of an olefin such as ethylene or propylene and another monomer which is copolymerizable with the olefin. For example, by using a monomer having a polar group as the other monomer, a resin having a polar group can be obtained. Examples of such a polar resin (D) include ethylene/acrylic acid/glycidyl methacrylate copolymers, and polyhydroxy polyolefin oligomers and the like. The polar resin (D) can be used singly or in combination of two or more.

When the first resin layer 31 and/or the second resin layer 32 contains the polar resin (D), the content is preferably from 1% by mass to 20% by mass, and more preferably from 5% by mass to 15% by mass relative to the total mass of the layers. When the content of the polar resin (D) is 1% by mass or more, there is a tendency for the adhesion to the metal terminal under room temperature environmental conditions to improve. Further, when the content is 20% by mass or less, there is a tendency for a reduction in the openability under high temperature environmental conditions, and a reduction in the adhesion to the exterior material under room temperature environmental conditions, to be more easily suppressed.

In the first resin layer 31 and the second resin layer 32, when one or more of the components (A) to (C) described above are resins having a polar group, the ratio of the resin having the polar group to the total mass of the components (A) to (C) is preferably 40% by mass or more, and more preferably 80% by mass or more from the viewpoint of further improving the adhesion to the metal terminal under room temperature environmental conditions.

Additives other than those mentioned above may be added to the first resin layer 31 and the second resin layer 32. Examples of the additive include antioxidants, slip agents, flame retardants, antiblocking agents, light stabilizers, dehydrating agents, tackifiers, and crystal nucleating agents. These can be used singly or in combination of two or more.

The thickness of the first resin layer 31 and the second resin layer 32 is preferably from 10 μm to 100 μm and more preferably from 15 μm to 50 μm. When the thickness of the first resin layer 31 and the second resin layer 32 is 10 μm or more, the adhesion to the metal terminal 14 is sufficiently superior. When the thickness of the first resin layer 31 is 100 μm or less, an increase in the cost of the resin film for a terminal 16 can be suppressed.

The heat of dissolution of the first resin layer 31 and the second resin layer 32 measured by DSC has at least one peak, and the peak top is in the range from 80° C. to 135° C., and more preferably is in the range from 100° C. to 125° C. By satisfying the above condition, the openability under high temperature environmental conditions can be further improved. Furthermore, the heat of dissolution of the first resin layer 31 and the second resin layer 32 preferably has a second peak top located at a higher temperature than the first peak top, and the second peak top is in the range from 110° C. to 165° C., and more preferably in the range from 120° C. to 150° C. The appearance of this second peak top enables the non-openability under non-high temperature environmental conditions to be improved in addition to the openability under high temperature environmental conditions.

The intermediate layer 33 is disposed between the first resin layer 31 and the second resin layer 32. One surface of the intermediate layer 33 is covered with the first resin layer 31, and the other surface is covered with the second resin layer 32.

The intermediate layer 33 is preferably an insulating layer. The insulating layer is a layer to prevent a reduction in the insulation properties caused by the sealant (the sealant of the exterior material and the first and second resin layers of the resin film for a terminal) flowing out during heat sealing and the exposed metal layer of the exterior material making contact with the metal terminal. Therefore, the insulating layer is preferably formed using a resin having a high melting point or glass transition temperature that does not flow out during heat sealing.

As the resin constituting the insulating layer, for example, polyethylene terephthalate, polyethylene naphthalate, polyphenylene sulfide, polymethylpentene, polyacetal, cyclic polyolefin, polyamide, polycarbonate, polyphenylene ether, polypropylene and the like can be used. Among these, from the viewpoint of the film forming properties, interlayer adhesion, and impact resistance and the like, polypropylene is preferably used, and block polypropylene is particularly preferable. When the insulating layer contains polypropylene, the compatibilizer (B) contained in the first resin layer 31 and the second resin layer 32 improves not only the adhesion to the exterior material, but also the adhesion to the insulating layer. These resins can be used singly or in combination of two or more.

The insulating layer may be colored by adding a pigment to the insulating layer. As a result of coloring the insulating layer, it is possible to improve the visual recognition of the resin film for a terminal 16. Thus, accuracy is improved in inspecting the resin film for a terminal 16 (specifically, for example, in inspecting whether the resin film for a terminal 16 is attached to the metal terminal 14, or in inspecting the attachment position of the resin film for a terminal 16 with respect to the metal terminal 14). Examples of the pigment include copper oxide, cobalt oxide, zinc oxide, titanium oxide, carbon black, barium sulfate, a quinacridone pigment, a polyazo pigment, and an isoindolinone pigment.

Furthermore, the intermediate layer 33 may be a layer having a configuration other than that of the insulating layer mentioned above. For example, the intermediate layer 33 may be a layer satisfying the requirements of at least one of a layer containing a resin having a crosslinked structure (crosslinked layer), and a layer containing at least one substance selected from a group consisting of fillers and fibers (reinforcing layer).

Examples of the resin having a crosslinked structure in the crosslinked layer include crosslinked acrylic resin, epoxy resin, phenol resin, urea resin, melamine resin, and polyurethane resin. These can be used singly or in combination of two or more.

Examples of the filler in the reinforcing layer include silica particles, alumina particles, barium sulfate particles, and calcium carbonate particles. These can be used singly or in combination of two or more. The average particle size of the filler is preferably from 0.1 μm to 10 μm and the content of the filler is preferably from 0.5% by mass to 20% by mass relative to the total mass of the reinforcing layer (intermediate layer 33).

Examples of the fiber in the reinforcing layer include cellulose resins and fibers made of a resin used as a heat-resistant layer having a melting point of 200° C. or higher. These can be used singly or in combination of two or more. The fiber width of the fiber is preferably from 10 nm to 10 μm and the content of the fiber is preferably from 0.5% by mass to 70% by mass relative to the total mass of the reinforcing layer (intermediate layer 33). The fibers may form a non-woven fabric.

The reinforcing layer can be a layer in which the filler and/or fiber mentioned above is dispersed in the polyolefin resin, the resin having a melting point of 200° C. or higher, the resin having a crosslinked structure, or the like.

The intermediate layer 33 does not have to have a single-layer structure. For example, it may have a multi-layer structure in which a plurality of resin layers are adhered to each other via an adhesive agent or the like. Therefore, the intermediate layer 33 may have a multilayer structure including two or more of the insulating layer, the crosslinked layer, and the reinforcing layer.

The thickness of the intermediate layer 33 (the entire thickness in the case of a multilayer structure) is, for example, appropriately set in the range from 10 μm to 200 μm, and is preferably from 20 μm to 100 μm. In terms of the thickness of the intermediate layer 33, it is important that there is a balance between the thickness of the metal terminal 14 and the thickness of the first resin layer 31. Therefore, when the first resin layer 31 and the metal terminal 14 are thick, the thickness of the intermediate layer 33 may accordingly have a large thickness.

The total thickness of the first resin layer 31, the second resin layer 32, and the intermediate layer 33 (thickness of the resin film for a terminal 16) is, from the viewpoint of the heat sealing properties, and the embedding properties and insulating properties of the metal terminal, preferably from 10 μm to 500 μm, more preferably from 15 μm to 300 μm, and even more preferably from 30 μm to 200 μm.)

When the intermediate layer 33 is an insulating layer, the ratio of the thicknesses of the first resin layer 31, the intermediate layer 33, and the second resin layer 32 (first resin layer 31: intermediate layer 33: second resin layer 32) may, for example, be 2:1:2, 1:2:1, or 1:1:1 such that the thicknesses of the first resin layer 31 and the second resin layer 32 are the same. Further, from the viewpoint of the embedding properties of the metal terminal, the thickness of the first resin layer 31 that makes contact with the metal terminal may be made larger than the thickness of the second resin layer 32, such as in the ratios 3:1:1, 2:2:1, or 5:3:2.

When the thicknesses of the first resin layer 31 and the second resin layer 32 are the same, the ratio of the thickness to the thickness of the intermediate layer 33 (first resin layer 31 or second resin layer 32: intermediate layer 33) may be 1:3 to 3:1, or 1:2 to 2:1. When the thickness of the first resin layer 31 is made thicker than the thickness of the second resin layer 32, the ratio of the thickness of the first resin layer 31 to the thickness of the intermediate layer 33 (first resin layer 31: intermediate layer 33) may be 4:1 to 1:1, or 3:1 to 1:1, and the ratio of the thickness of the second resin layer 32 to the thickness of the intermediate layer 33 (second resin layer 32: intermediate layer 33) may be 1:3 to 3:1, or 1:2 to 2:1.

While a preferred embodiment of the present disclosure has been described above, the present disclosure is not limited to this specific embodiment, and various alterations and modifications can be made within the scope of the present disclosure as defined in the appended claims.

For example, in FIG. 3, a resin film for a terminal 16 having a three-layer structure has been described as an example. However, a second intermediate layer composed of an insulating resin and the like may be disposed between the intermediate layer 33 and the first resin layer 31, and between the intermediate layer 33 and the second resin layer 32.

In this way, by disposing a second intermediate layer between the intermediate layer 33 and the first resin layer 31, and between the intermediate layer 33 and the second resin layer 32 to form a multilayer structure having four or more layers, it is possible to improve the insulation properties between the intermediate layer 33 and the barrier layer 24 (metal layer) constituting the exterior material 13, and the insulation properties between the intermediate layer 33 and the metal terminal 14. The second intermediate layer may also be the crosslinked layer or the reinforced layer described above.

Furthermore, the resin film for a terminal 16 may be constituted by one or two layers.

When the terminal resin film 16 has a one-layer (single-layer) structure, the one layer can have the same structure as the first resin layer 31 described above. In this case, from the viewpoint of the heat sealing properties, and the embedding properties and insulating properties of the metal terminal, the thickness of the first resin layer 31 is preferably from 10 μm to 500 μm more preferably from 15 μm to 300 μm and even more preferably from 30 μm to 200 μm.

When the resin film for a terminal 16 has a two-layer structure, the side in contact with the metal terminal 14 represents a first resin layer, the side in contact with the exterior material 13 represents a second resin layer, such that at least one of the layers has the same configuration as the first resin layer 31 described above, and the other layer may have the same configuration as the second resin layer 32 or the intermediate layer 33 described above. Further, the other layer may have a configuration which is different from that of the second resin layer 32 or the intermediate layer 33 described above.

Furthermore, the first resin layer 31 and the second resin layer 32 may have the same configuration, or may have different configurations. When the resin film for a terminal of the present disclosure has a plurality of layers, at least one layer is a resin layer containing the polyethylene (A) and the compatibilizer (B), and the other layers do not have to satisfy the requirements of the resin layers described above. Therefore, one of the first resin layer 31 and the second resin layer 32 is a layer containing the polyethylene (A) and the compatibilizer (B), and the other may be a layer that does not contain one or both of the polyethylene (A) and the compatibilizer (B). However, from the viewpoint of sufficiently obtaining the effects of the present disclosure, and suppressing the occurrence of curling of the resin film for a terminal, the two layers forming both surfaces of the resin film for a terminal are preferably resin layers containing the polyethylene (A) and the compatibilizer (B), and are more preferably layers having substantially the same material composition.

Next, a method of producing the resin film for a terminal 16 of the present embodiment will be briefly described. The method of producing the resin film for a terminal 16 is not particularly limited. The resin film for a terminal 16 can be fabricated using a film-extrusion fabrication device having a die, such as a round die used in inflation molding or a T-die used in die pressing. However, from the viewpoint of film formation stability, multilayer inflation molding is preferably used.

As an example of the method of producing the resin film for a terminal 16, the following description describes a case where the resin film for a terminal 16 is produced using inflation molding method (i.e. using an inflation molding device).

First, the base materials of the first resin layer 31, the second resin layer 32, and the intermediate layer 33 are prepared. Then, the base materials of the first resin layer 31, the second resin layer 32, and the intermediate layer 33 are supplied to an inflation molding apparatus. Then, the three base materials are extruded from an extrusion portion of the inflation molding device so as to form a three-layer structure (a structure in which the first resin layer 31, the second resin layer 32 and the intermediate layer 33 are laminated), while air is also supplied from inside the extruded laminate having the three-layer structure.

Then, the cylindrical resin film for a terminal 16, which is transported while being inflated in a cylindrical shape, is deformed into a flat shape by a guide portion. Then, the resin film for a terminal 16 is folded into a sheet form by a pair of pinch rolls. The resin film for a terminal 16 is finally produced in a roll form by slitting both ends of the folded tube, and taking up the pair (two strips) of films using take-up cores.

For example, the extrusion temperature at which the resin film for a terminal 16 is produced is preferably in the range of 130 to 300° C., and more preferably in the range of 130 to 250° C. When the extrusion temperature is 130° C. or higher, the melting of the resin constituting each layer is sufficient, which leads to a low melting viscosity. As a result, it is easier for the extrusion from a screw to stabilize. On the other hand, when the extrusion temperature is 300° C. or lower, oxidation and deterioration of the resin constituting each layer is suppressed. As a result, it is possible to prevent a decrease in the quality of the resin film for a terminal 16.

The revolution speed, blow ratio, pulling speed, and the like of each screw can be appropriately determined taking account of the film thickness that has been set. Furthermore, the thickness ratio of the layers of the resin film for a terminal 16 can be easily controlled by changing the revolution speed of each of the screws.

The resin film for a terminal 16 of the present embodiment may be produced through dry lamination using an adhesive, or through sandwich lamination in which prepared insulating layers (insulating films) are laminated.

Referring to FIG. 3, a heat sealing process will be described in which the resin film for a terminal 16 and the metal terminal 14 of the present embodiment are thermally adhered to each other. For example, in the heat sealing process, melting of the first resin layer 31 by heating is conducted concurrently with achieving intimate contact between the first resin layer 31 and the metal terminal 14 by pressing, thereby heat sealing the resin film for a terminal 16 and the metal terminal 14 to each other.

Furthermore, in the heat sealing process described above, in order to obtain sufficient adhesion and sealing properties between the resin film for a terminal 16 and the metal terminal 14, heating is conducted to a temperature of at least equal to or higher than the melting point of the resin constituting the first resin layer 31.

Specifically, for example, a temperature in the range of 140 to 170° C. can be used as the heating temperature of the resin film for a terminal 16. Furthermore, the processing time (sum of the heating time and the pressing time) can be determined by taking account of the peeling strength and productivity. The processing time can be appropriately set in the range of 1 to 60 seconds, for example.

When the production takt (productivity) of the resin film for a terminal 16 has priority, heat sealing may be conducted with a shorter pressing time at a temperature exceeding 170° C. In this case, the heating temperature can be in the range of 170 to 230° C., for example, while the pressing time can be in the range of 3 to 20 seconds, for example.

EXAMPLES

The present disclosure will be more specifically described below based on Examples and Comparative Examples. However, the present disclosure is not limited to the following Examples.
[Materials Used]
Materials used in examples and comparative example are shown in Table 1 below.

TABLE 1

| Layer | Component | | Details | Melting Point (Main peak) |
|---|---|---|---|---|
| Resin Layer | Polyethylene (A) | A1 | Acid-modified LLDPE (with polar group) | 120° C. |
| | | A2 | Acid-modified LDPE (with polar group) | 110° C. |
| | | A3 | LLDPE (without polar group) | 120° C. |
| | Compatibilizer (B) | B1 | PP-PE block copolymer (with amorphous unit) | 108° C. |
| | | B2 | PP-PE block copolymer (without amorphous unit) | 105° C. |
| | | B3 | PP-PE graft copolymer (with amorphous unit) | 103° C. |
| | | B4 | Ethylene-ethylene/butylene block copolymer (with amorphous unit) | 97° C. |
| | | B5 | PP-PE random copolymer (with amorphous unit) | 115° C. |
| | Polypropylene (C) | C1 | Acid-modified random PP (with polar group) | 138° C. |
| | | C2 | Acid-modified homo-PP (with polar group) | 164° C. |
| | | C3 | Random PP (without polar group) | 137° C. |
| | Polar resin (D) | D | Ethylene/acrylic acid/glycidyl methacrylate copolymer | 102° C. |
| Insulation Layer | Base resin | E | Block PP | 164° C. |
| | Pigment | F | Black pigment | — |

[Production of Resin Film for Terminal]

Examples 1 to 16 and Comparative Examples 1 to 4

Each component of the resin layer shown in Table 2 was blended in the blending amount shown in the table (unit: % by mass, abbreviated as "%" in the table), and then dry-blended to prepare a base material of the resin layer. Then, using an inflation type film extrusion production device (Co-OI type) manufactured by Sumitomo Heavy Industries Modern Ltd., the base material was extruded at a melting temperature of 210° C. to obtain a resin film for a terminal composed of a single resin layer having a thickness of 100 μm. When the heat of melting of each film was measured by DSC, peaks corresponding to the melting point of each resin component were detected.

Examples 17 to 22

Each component of the resin layer and the insulating layer shown in Table 2 was blended in the blending amount shown in the table (unit: % by mass, abbreviated as "%" in the table), and then dry-blended to prepare both a base material of the resin layer and a base material of the insulating layer. When preparing the base material for the insulating layer, a part of the block PP, which is the base resin, and a black pigment were mixed in advance to prepare a masterbatch, and then the masterbatch was dry-blended with the remaining base resin. Furthermore, when the heat of melting of each film was measured by DSC, peaks corresponding to the melting point of each resin component were detected.

Then, the base material of the resin layer (first resin layer), the base material of the insulating layer (intermediate layer), and the base material of the resin layer (second resin layer) were set inside an inflation type film extrusion production device (Co-OI type) manufactured by Sumitomo Heavy Industries Modern Ltd., and a resin film for a terminal having a three-layer structure composed of the first resin layer/insulating layer/second resin layer was prepared by extruding the three base materials using the film extrusion production device. The melting temperature of each base material was 210° C. In each Example, the thicknesses of the first resin layer (lead side)/insulating layer/second resin layer (exterior material side) were as follows.

| [0121] | Examples 17 and 20: | 25 μm/50 μm/25 μm |
| [0122] | Examples 18 and 21: | 40 μm/40 μm/20 μm |
| [0123] | Examples 19 and 22: | 50 μm/30 μm/20 μm |

[Measurement of Initial (Room Temperature) Heat Sealing Strength with Respect to Exterior Material]

Figure 4:
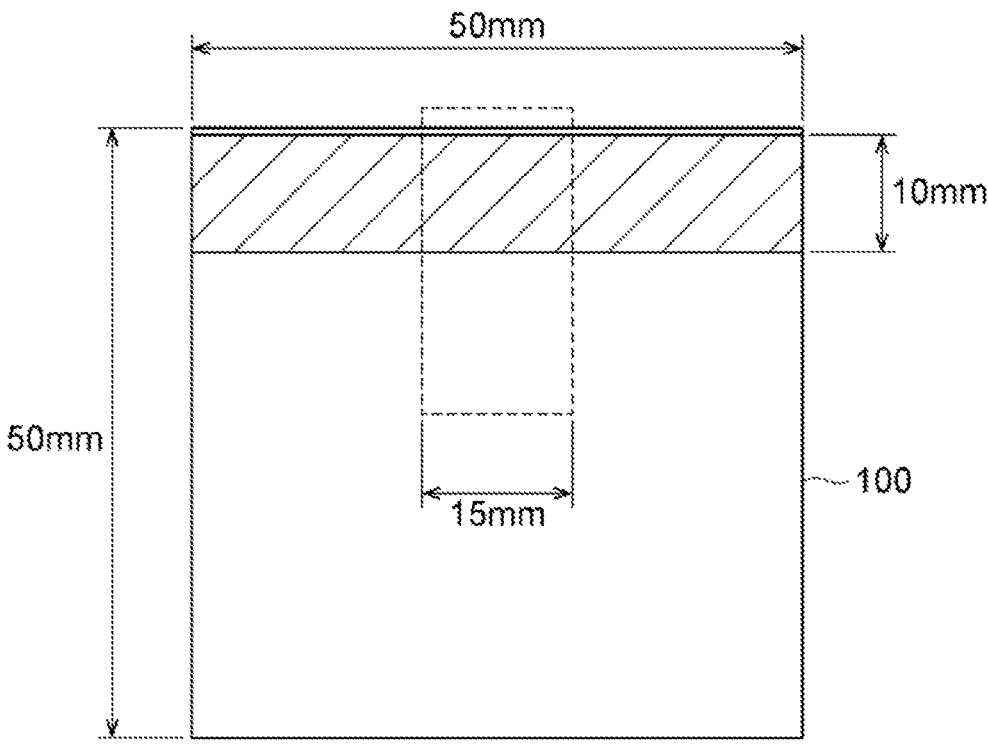
FIG. 4 is a schematic diagram illustrating a method of producing samples for a heat sealing strength measurement in the Examples.

A sample obtained by cutting the resin film for a terminal to a size of 50 mm (TD)×100 mm (MD) was folded in two so as to sandwich a chemically treated aluminum foil cut to a size of 50 mm×50 mm, and the edge portion on the opposite side to the folded section was heat sealed at 165° C./0.6 MPa/10 seconds with a width of 10 mm. Then, the sealant layer of the exterior material, which has a laminated structure composed of a nylon film (thickness: 25 μm)/adhesive agent/aluminum foil (thickness: 40 μm)/polypropylene sealant layer (thickness: 80 μm) was folded into two so as to make contact with the resin film for a terminal, and the end on the opposite side to the folded portion (the same location as the location in which the resin film for a terminal and the aluminum foil was heat sealed) was heat sealed at 190° C./0.5 MPa/5 seconds with a width of 10 mm. Thereafter, a sample for the heat sealing strength measurement was prepared by cutting the heat sealed portion to a width of 15 mm at a central portion in the lengthwise direction (see FIG. 4). In the present evaluation, the laminate 100 in FIG. 4 is a laminate composed of the exterior material/resin film for a terminal/aluminum foil/resin film for a terminal/exterior material. A T-peel test between the exterior material and the resin film for a terminal was performed for the heat sealed portion of the sample using a tensile tester (manufactured by Shimadzu Corporation) under room temperature (25° C.) environmental conditions and a tensile speed of 50 mm/min. From the obtained results, the initial heat sealing strength against the exterior material was evaluated based on the following evaluation criteria. An evaluation of A, B, or C represents a pass, and D represents a fail. The results are shown in Table 2.

A: Heat sealing strength of 100 N/15 mm or more
B: Heat sealing strength of 90 N/15 mm or more and less than 100 N/15 mm.
C: Heat sealing strength of 80 N/15 mm or more and less than 90 N/15 mm
D: Heat sealing strength of less than 80 N/15 mm

[Measurement of Initial (Room Temperature) Heat Sealing Strength Against Lead]

A sample obtained by cutting the resin film for a terminal to a size of 50 mm (TD)×100 mm (MD) was folded in two so as to sandwich a chemically treated aluminum foil cut to a size of 50 mm×50 mm, and the edge portion on the opposite side to the folded section was heat sealed at 165° C./0.6 MPa/10 seconds with a width of 10 mm. Thereafter, a sample for the heat sealing strength measurement was prepared by cutting the heat sealed portion to a width of 15 mm at a central portion in the lengthwise direction (see FIG. 4). In the present evaluation, the laminate 100 in FIG. 4 is a laminate composed of the resin film for a terminal/aluminum foil/resin film for a terminal. A T-peel test between the aluminum foil (lead) and the resin film for a terminal was performed for the heat sealed portion of the sample using a tensile tester (manufactured by Shimadzu Corporation) under room temperature (25° C.) environmental conditions and a tensile speed of 50 mm/min. From the obtained results, the initial heat sealing strength against the lead was evaluated based on the following evaluation criteria. An evaluation of A, B, or C represents a pass, and D represents a fail. The results are shown in Table 2.

A: Heat sealing strength of 25 N/15 mm or more
B: Heat sealing strength of 20 N/15 mm or more and less than 25 N/15 mm
C: Heat sealing strength of 15 N/15 mm or more and less than 20 N/15 mm
D: Heat sealing strength of less than 15 N/15 mm

[Measurement of Heat Sealing Strength Under 100° C. Environment]

The sample used for the heat sealing strength measurement was prepared in the same manner as the measurement of the initial heat sealing strength with respect to the lead. After allowing the sample to stand for 5 minutes under a 100° C. environment, a T-peel test between the aluminum foil (lead) and the resin film for a terminal was performed for the heat sealed portion of the sample using a tensile tester (manufactured by Shimadzu Corporation) under a 100° C. environment and a tensile speed of 50 mm/min. From the obtained results, the heat sealing strength under a 100° C. environment was evaluated based on the following evaluation criteria. Because a battery is sometimes stored under a 60 to 100° C. environment for aging, it is desirable for the heat sealing strength to be at least a certain level under a 100° C. environment. The results are shown in Table 2.

A: Heat sealing strength of 4 N/15 mm or more
B: Heat sealing strength of 3 N/15 mm or more and less than 4 N/15 mm.
C: Heat sealing strength of 2 N/15 mm or more and less than 3 N/15 mm
D: Heat sealing strength was less than 2 N/15 mm.

[Measurement of Heat Sealing Strength Under 130° C. Environment (Evaluation of Openability)]

The sample used for the heat sealing strength measurement was prepared in the same manner as the measurement of the initial heat sealing strength with respect to the lead. After allowing the sample to stand for 5 minutes under a 130° C. environment, a T-peel test between the aluminum foil (lead) and the resin film for a terminal was performed for the heat sealed portion of the sample using a tensile tester (manufactured by Shimadzu Corporation) under a 130° C. environment and a tensile speed of 50 mm/min. From the obtained results, the heat sealing strength under a 130° C. environment was evaluated based on the following evaluation criteria. The organic solvent volatilizes or decomposes at a temperature of 130° C. and the inside of the exterior material begins to expand. The lower the heat sealing strength at this temperature, the better the openability under high temperature environmental conditions, and the higher the level of safety. An evaluation of A, B, or C represents a pass, and D represents a fail. The results are shown in Table 2.

A: Heat sealing strength of less than 2 N/15 mm.

B: Heat sealing strength of 2 N/15 mm or more and less than 3 N/15 mm.

C: Heat sealing strength of 3 N/15 mm or more and less than 5 N/15 mm

D: Heat sealing strength of 5 N/15 mm or more

[Evaluation of Insulation Properties]

(1) Production of Tab

A lead having width 5 mm, length 30 mm and thickness 100 μm was employed. The material of the positive electrode was aluminum, and the material of the negative electrode was nickel. Non-chromium surface treatment was applied to both the positive electrode and the negative electrode. A film cut into a width of 15 mm and a length of 10 mm was used as the resin film for the terminal. The resin film for a terminal/lead/resin film for a terminal were laminated in this order, and these were fused at a fusion temperature of 150° C. and a fusion time of 10 seconds. As a result, a positive electrode tab and a negative electrode tab were obtained.

(2) Production of Battery Pack

An exterior material having a laminated structure composed of a nylon film (thickness: 25 μm)/polyester polyol adhesive agent (thickness: 5 μm)/aluminum foil (thickness: 40 μm, material: A8079-O)/acid-modified polypropylene (thickness: 30 μm)/polypropylene (thickness: 40 μm) was used. Non-chromium surface treatment was applied to both surfaces of the aluminum foil. The size of the exterior material was 50 mm×90 mm, and after folding the long side into two, heat sealing of one of the sides that was now 45 mm wide was performed while sandwiching the positive electrode tab and the negative electrode tab. The heat sealing was performed at 190° C. for 5 seconds. The heat sealing of the two remaining sides without tabs was performed at a temperature of 190° C. for 3 seconds. First, heat sealing was applied to the surface opposite to the folded side. Then, 2 mL of an electrolyte obtained by adding $LiPF_6$ (lithium hexafluorophosphate) to a liquid mixture of diethyl carbonate and ethylene carbonate was filled, and the surface opposite to the tab was finally heat sealed. As a result, a battery pack for evaluating the tab, in which battery elements such as collectors were not encapsulated, was produced. The production conditions of the battery pack described above are more severe in terms of the heating temperature and heat sealing time than the conditions of an actual battery production process.

(3) Evaluation of Insulating Properties

The insulation properties between the negative electrode lead of the battery pack prepared as described above and the packaging material was measured using a tester. The insulation properties were evaluated based on the number of samples out of 200 samples in which shorting occurred based on the following evaluation criteria. The results are shown in Table 2.

A: Less than 2 shorted samples

B: 2 or more but less than 4 shorted samples

C: 4 or more but less than 6 shorted samples

D: 6 or more shorted samples

TABLE 2

| | Resin Film for Terminal | | | | | | | Evaluation Results | | | | |
| | Resin Layer | | | | | Insulation Layer | | Heat Sealing Strength at Room Temperature to Exterior Material | Heat Sealing Strength at Room Temperature to Lead | Heat Sealing Strength at 100° C. to Lead | Heat Sealing Strength at 130° C. to Lead (Openability) | Insulation Properties |
| | (A) PE | (B) Compatibilizer | (C) PP | (D) Polar Resin | Mass ratio (A)/(B) | Base Resin | Pigment | | | | | |
| Example 1 | A2 10% | B1 90% | — | — | 0.1 | — | — | A | C | C | A | B |
| Example 2 | A2 40% | B1 60% | — | — | 0.7 | — | — | A | B | C | A | B |
| Example 3 | A1 75% | B1 25% | — | — | 3.0 | — | — | A | A | C | A | B |
| Example 4 | A2 90% | B1 10% | — | — | 9.0 | — | — | B | A | C | A | B |
| Example 5 | A2 98% | B1 2% | — | — | 49.0 | — | — | C | A | C | A | B |
| Example 6 | A1 67.5% | B1 22.5% | C1 10% | — | 3.0 | — | — | A | A | B | A | B |
| Example 7 | A1 45% | B1 15% | C1 40% | — | 3.0 | — | — | A | A | A | A | B |
| Example 8 | A1 7.5% | B1 2.5% | C1 90% | — | 3.0 | — | — | A | A | A | C | B |
| Example 9 | A1 45% | B2 15% | C1 40% | — | 3.0 | — | — | A | A | A | B | B |
| Example 10 | A1 45% | B3 15% | C1 40% | — | 3.0 | — | — | A | A | A | A | B |
| Example 11 | A1 45% | B4 15% | C1 40% | — | 3.0 | — | — | A | A | A | A | B |
| Example 12 | A1 45% | B5 15% | C1 40% | — | 3.0 | — | — | C | A | A | A | B |
| Example 13 | A2 45% | B1 15% | C1 40% | — | 3.0 | — | — | A | A | A | A | B |
| Example 14 | A1 45% | B1 15% | C2 40% | — | 3.0 | — | — | A | A | A | C | B |
| Example 15 | A3 45% | B1 15% | C3 40% | — | 3.0 | — | — | A | C | C | A | B |
| Example 16 | A3 40.9% | B1 13.6% | C3 36.4% | D 9.1% | 3.0 | — | — | A | B | B | A | B |
| Example 17 | A1 45% | B1 15% | C1 40% | — | 3.0 | E 100% | — | A | A | A | A | A |
| Example 18 | A1 45% | B1 15% | C1 40% | — | 3.0 | E 100% | — | A | A | A | A | A |
| Example 19 | A1 45% | B1 15% | C1 40% | — | 3.0 | E 100% | — | A | A | A | A | A |
| Example 20 | A1 45% | B1 15% | C1 40% | — | 3.0 | E 95% | F 5% | A | A | A | A | A |
| Example 21 | A1 45% | B1 15% | C1 40% | — | 3.0 | E 93.7% | F 6.3% | A | A | A | A | A |
| Example 22 | A1 45% | B1 15% | C1 40% | — | 3.0 | E 91.7% | F 8.3% | A | A | A | A | A |

TABLE 2-continued

| | Resin Film for Terminal | | | | | | | Evaluation Results | | | | |
| | Resin Layer | | | | | Insulation Layer | | Heat Sealing Strength at Room Temperature to Exterior Material | Heat Sealing Strength at Room Temperature to Lead | Heat Sealing Strength at 100° C. to Lead | Heat Sealing Strength at 130° C. to Lead (Openability) | Insulation Properties |
| | (A) PE | (B) Compatibilizer | (C) PP | (D) Polar Resin | Mass ratio (A)/(B) | Base Resin | Pigment | | | | | |
|---|---|---|---|---|---|---|---|---|---|---|---|---|
| Comparative Example 1 | A1 100% | — | — | — | — | — | — | D | A | C | A | B |
| Comparative Example 2 | — | B1 100% | — | — | — | — | — | A | D | D | A | B |
| Comparative Example 3 | — | — | C1 100% | — | — | — | — | A | A | A | D | B |
| Comparative Example 4 | A1 50% | — | C1 50% | — | — | — | — | D | C | C | A | B |

REFERENCE SIGNS LIST

10 . . . Power storage device; 11 . . . Power storage device body; 13 . . . Exterior material; 14 . . . Metal terminal; 14-1 . . . Metal terminal body; 14-2 . . . Anti-corrosion layer; 16 . . . Resin film for terminal; 21 . . . Inner layer; 22 . . . Inner layer-side adhesive layer; 23-1, 23-2 . . . Anti-corrosion treatment layer; 24 . . . Barrier layer; 25 . . . Outer layer-side adhesive layer; 26 . . . Outer layer; 31 . . . First resin layer; 32 . . . Second resin layer; 33 . . . Intermediate layer.

What is claimed is:

1. A resin film for a terminal for covering an outer peripheral surface of part of a metal terminal that constitutes a power storage device, comprising:

a resin layer containing a polyethylene (A), and a compatibilizer (B) that has an amorphous unit and has a region that is compatible with the polyethylene (A) and a region that is compatible with polypropylene, wherein a mass ratio of the polyethylene (A) to the compatibilizer (B) is 0.15 to 30, and wherein the resin layer further contains a polypropylene (C).

2. The resin film for a terminal of claim 1, wherein the compatibilizer (B) is a graft copolymer.

3. The resin film for a terminal of claim 1, wherein a mass ratio ((A)/(B)) of the polyethylene (A) and the compatibilizer (B) contained in the resin layer is 0.15 to 30.

4. The resin film for a terminal of claim 1, wherein the resin layer contains a resin having a polar group.

5. The resin film for a terminal of claim 1, wherein the resin film for a terminal comprises three or more layers, and a layer disposed at least on both surfaces of the resin film for a terminal is the resin layer.

6. The resin film for a terminal of claim 1, wherein the compatibilizer (B) is a block copolymer.

7. The resin film for a terminal of claim 1, wherein a mass ratio ((A)/(B)) of the polyethylene (A) and the compatibilizer (B) contained in the resin layer is 0.5 to 10.

8. The resin film for a terminal of claim 1, wherein a mass ratio ((A)/(B)) of the polyethylene (A) and the compatibilizer (B) contained in the resin layer is 1.0 to 5.

9. The resin film for a terminal of claim 1, wherein a content of the region that is compatible with the polyethylene (A) and a content of the region that is compatible with polypropylene are in ratio of 1/9 to 9/1.

10. The resin film for a terminal of claim 1, wherein a content of the region that is compatible with the polyethylene (A) and a content of the region that is compatible with polypropylene are in ratio of 2/8 to 8/2.

11. The resin film for a terminal of claim 1, wherein a content of the region that is compatible with the polyethylene (A) and a content of the region that is compatible with polypropylene are in ratio of 3/7 to 7/3.

12. The resin film for a terminal of claim 1, wherein the polyethylene (A) has a melting point from 80 to 135° C.

13. The resin film for a terminal of claim 1, wherein the resin layer further contains a polypropylene (C) and (B) is a polypropylene-polyethylene block.

14. The resin film for a terminal of claim 6, wherein the resin layer further contains a polypropylene (C) and (B) is an ethylene-ethylene-butylene block copolymer.

15. The resin film for a terminal of claim 1, wherein the polyethylene (A) is a modified polyethylene having a polar group.

16. The resin film for a terminal of claim 1, wherein the polar group is an acid anhydride group.

17. The resin film for a terminal of claim 1, wherein the polyethylene (A) is an acid-modified polyethylene.

18. A power storage device, comprising:

a power storage device body;

a metal terminal electrically connected to the power storage device body;

an exterior material that sandwiches the metal terminal and accommodates the power storage device body; and a resin film disposed between the metal terminal and the exterior material so as to cover an outer peripheral surface of part of the metal terminal;

wherein the resin film comprises:

a resin layer containing a polyethylene (A), and a compatibilizer (B) that has an amorphous unit and has a region that is compatible with the polyethylene (A) and a region that is compatible with polypropylene;

wherein a mass ratio of the polyethylene (A) to the compatibilizer (B) is 0.15 to 30, and wherein the resin layer further contains a polypropylene (C);

and wherein the exterior material has a sealant layer containing polypropylene on a surface that makes contact with the resin film for a terminal.

* * * * *